A. ELMENDORF.
TEARING TESTER.
APPLICATION FILED FEB. 3, 1920.
1,423,841.
Patented July 25, 1922.
2 SHEETS—SHEET 1.
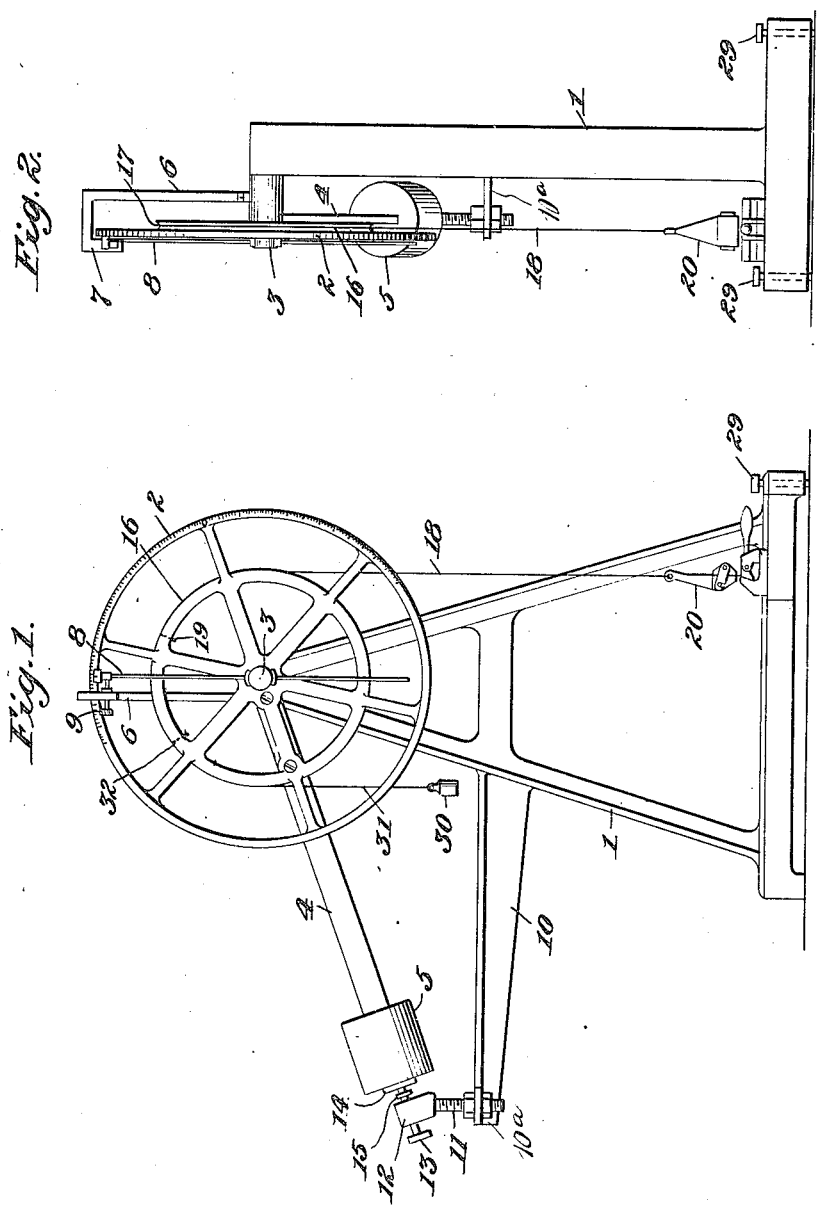
Inventor:
Armin Elmendorf,
by Wm. L. Symons
Atty.

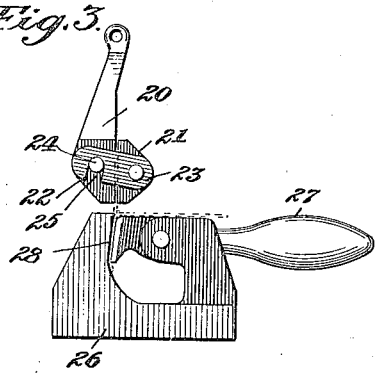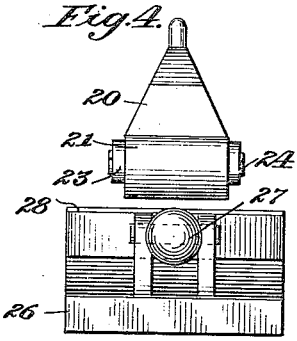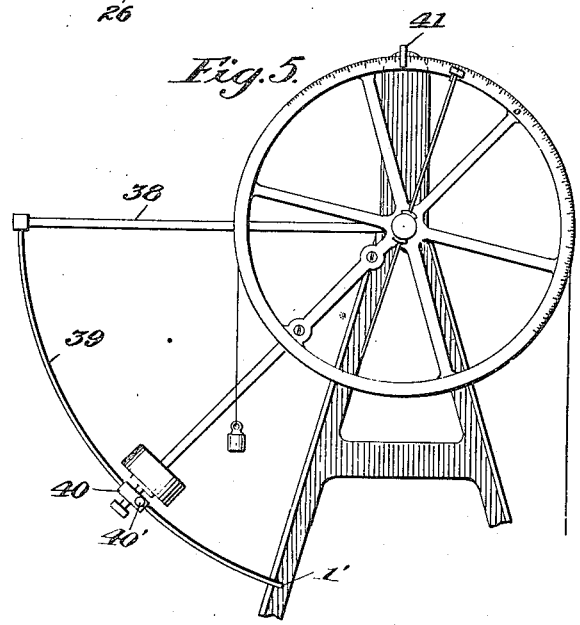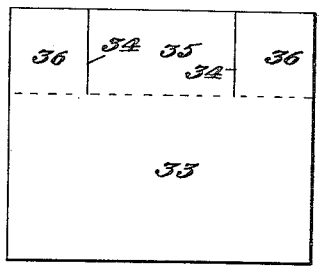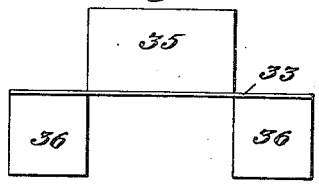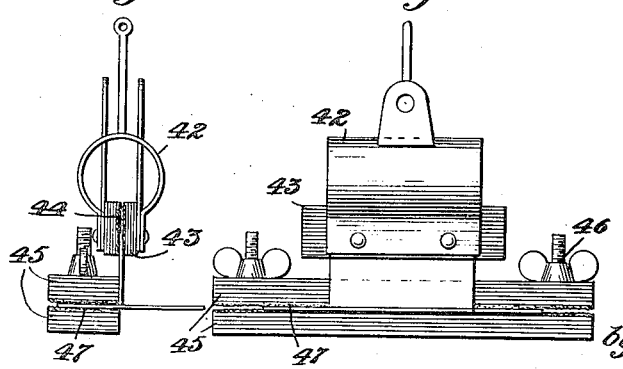

UNITED STATES PATENT OFFICE.

ARMIN ELMENDORF, OF MADISON, WISCONSIN.

TEARING TESTER.

1,423,841.    Specification of Letters Patent.    Patented July 25, 1922.

Application filed February 3, 1920. Serial No. 356,078.

*To all whom it may concern:*

Be it known that I, ARMIN ELMENDORF, a citizen of the United States of America, residing at Madison, in the county of Dane and State of Wisconsin, have invented certain new and useful Improvements in Tearing Testers, of which the following is a specification.

My invention relates to a device for the purpose of testing the tearing strength of paper, fabrics, rubber, leather, and other materials.

An object of my invention is the construction of a device that will measure the tearing strength of materials by determining the work necessary to accomplish the tearing.

Tearing testing devices have usually been constructed to measure directly the tearing force. Such devices, however, are unreliable because of the non-uniform structure of the material acted upon. A further object of my invention, therefore, is the construction of a device to remedy this defect by measuring the work done in tearing the material acted upon.

A further object of my device is to utilize a calibrated wheel with a pendulum to determine the tearing force from the swing of the pendulum from one side of the vertical to the other side thereof.

In my invention a uniform size of material is selected to be tested. The use of a piece of material of certain size enables me, in accordance with my invention, to make the calculations by which the strength of materials can be accurately determined.

In order to accomplish these and other objects, I have embodied my invention in a device which is illustrated in the accompanying drawings, in which, Figure 1 is a front elevation of my device;

Figure 2 is a side elevation thereof;

Figure 3 is a front elevation of the gripping device used to hold the material;

Figure 4 is a side elevation thereof;

Figure 5 is a front elevation showing a part only of a modified form of device, the parts broken away being similar to those parts shown in Figure 1;

Figure 6 is a top plan view of the material to be tested, which is shown cut but not folded;

Figure 7 is a side elevation of the material in position to be torn;

Figure 8 is a front elevation of the gripping means used with the modified form of device; and Figure 9 is a side elevation thereof.

Referring to the accompanying drawings, a frame 1 has attached thereto a wheel 2 in any of the usual ways, as by an axis 3. A part of this wheel is a pendulum 4 on the end of which is a weight 5. Extending from this frame is a guide arm 6 which has a double right-angled curve at the top thereof with the outer part 7 extending downwardly. Placed on the same shaft with the wheel is a pointer 8 which is mounted frictionally on the shaft so that it will not be moved readily but will stop in the position to which it is pushed manually or by the downward movement of the wheel. The downward turn of the arm has a screw 9 therein which may be adjusted to move the pointer to the zero mark.

As a part of the frame of the device is an arm 10 having on the right angled end thereof, 10ª a screw elevating and lowering means 11 in the upper part 12 of which is a pin 13. The weight 5 has a projection 14 thereon in which is an opening, not shown, to receive the pin. This pin has a flange 15 to prevent its removal from the upper part of the elevating and lowering means.

Attached to the inner rim 16 of the wheel 2, which is grooved as shown at 17, is a belt or cord 18 attached by any convenient method such as a pin 19 as shown. The lower end of this cord has attached thereto a gripping member 20 composed of two parts. The part 21 may be removed from the part 22 in order to insert a portion of the material to be tested between the parts thereof. On each end of the part 21 is pivoted a latch 23 which may be attached to the part 22 by inserting the latch over a pin 24 in a groove 25 in the latch. Attached to the base of the machine by any convenient means is the other part of the device for gripping the material. This consists of a body part 26 in which is a handle 27 pivoted in the usual manner. The material is inserted in this gripping device by raising the handle thereof and placing the material within the jaw 28. The material is then clamped by pressing down the handle.

The frame may be placed in a horizontal position, if necessary, by means of the thumb screws 29.

The face of the wheel may be calibrated in any desired manner. As shown, a zero mark and a calibration ninety degrees each way therefrom are shown.

A counterweight 30 attached to the wheel in any suitable manner, as by a cord 31 attached to a pin 32, is used to balance the weight of the cord 18 and the means to attach said cord to the specimen of material to be torn.

The specimen of material 33 to be tested is cut as indicated at 34. The part 35 is placed in the part of the clamp attached to the cord, while the parts 36 are inserted in the part attached to the base of the device. The specimens may be of any desired suitable size, but I have shown a specimen which is two inches in width from the ends of the cut.

In the modified form of device shown in Figure 5, I have provided means for swinging the pendulum over a greater angle than it can be swung in the form illustrated in Figure 1. An arm 38 attached to the frame has secured to the free end thereof a curved guide means 39. This guide is attached to the frame as shown at 1'. The pendulum by means of this guide may be swung from approximately 25° to approximately 90°. The means to hold the pendulum in the modified form of the device consists of a sliding member 40 which may be stopped as desired on the guide 39 by the thumb screw 40'. The pendulum is held in this form by a pin as disclosed in Figure 1.

An abutting means 41 is placed so that the right-hand side thereof will cause the pointer to be at zero when the pendulum is vertical. The form of device disclosed in Figure 5 may be used to tear paper and similar light materials in which the angle through which the pendulum swings is greater than is required for heavier materials.

With the modified form of device, I clamp the material to be tested by means of a spring clamp 42 having jaws 43 having emery paper 44 or other suitable means attached to the faces thereof to hold the material to be tested.

A holder 45 is secured to the base of the device by screws 46 to hold the specimen to be tested. This holder may have emery paper 47 attached to the clamping faces thereof. The spring clamp, cord and counterweight are attached to the device in the same way as similar parts are attached to the wheel shown in Figure 1.

The operation of my device may be described as follows:

The pendulum to which the weight is attached is moved over to the left of the vertical to any desired angle and is held in position by the holding means while the angle to the left of the vertical is read. This angle is obtained by moving the pointer from zero to the stop. The paper or other material to be tested is then fastened by the gripping means, after which the holding pin is removed, allowing the pendulum to swing to the right of the vertical and tear the specimen. The stop pushes the pointer to the right as the pendulum swings to the right of the vertical, and, due to the friction of the bearing of the pointer on the shaft, the pointer remains in the position indicating the farthest swing to the right of the vertical. The distance from the center of the axis of rotation to the center of gravity may be denoted by $d$, and the weight of the entire pendulum, including the weight, by $W$. Now let $\theta_1$ be the initial angle, or the angle to the left, and $\theta_2$ be the final angle, or the angle to the right,—then the work done in tearing the specimen is given by the expression $Wd(\cos\theta_2 - \cos\theta_1)$. Dividing by the length of the tear, which is two inches, gives the average force exerted during the tear.

Having described my invention, what I claim is:

1. In a device of the kind described, means for testing the strength of material, comprising a wheel, a pendulum connected to said wheel, means for mounting the wheel to permit said wheel to turn and said pendulum to swing, means adapted to hold the material to be tested, a connection between said wheel and said holding means, means to hold said pendulum means to release said pendulum allowing the movement of said pendulum to tear the material to be tested, and indicator means adapted to co-operate with said wheel.

2. In a device of the kind described, means for holding the material to be tested, rotating means connected to said holding means to tear the material to be tested, and means co-operating with said holding and said rotating means to measure the work done in tearing the material to be tested.

3. In a device of the kind described, a frame, a clamp for holding the material to be tested, a wheel mounted on said frame to rotate to tear the material to be tested, a connection between said wheel and said clamp and means co-operating with said holding and said rotating means to measure the work done in tearing the material to be tested.

4. In a tearing tester, a frame, a wheel mounted to rotate on an axis on said frame, the circumference of said wheel being calibrated, means to rotate said wheel comprising a weighted pendulum, means to determine the angle from the vertical said pendulum is swung and means to vary the angle to the left of the vertical said pendulum may be swung.

5. In a tearing tester, a frame, a wheel mounted to rotate on an axis on said frame, means to rotate said wheel, means to hold the material to be tested, a connection between said wheel and said holding means and means on said wheel to counter-balance said connection means between said wheel and said holding means.

6. In a tearing tester, a frame, a wheel mounted to rotate on an axis on said frame, the circumference of said wheel being calibrated, means to rotate said wheel comprising a weighted pendulum, means to hold material to be tested, a connection between said wheel and said holding means and an indicator mounted on an axis on said frame and adapted to co-operate with said calibrated wheel.

7. In a tearing tester, a frame, a wheel mounted to rotate on an axis on said frame, the circumference of said wheel being calibrated, means to rotate said wheel comprising a weighted pendulum, means to hold the material to be tested, a connection between said wheel and said holding means, means on said wheel to counter-balance said connecting means between said wheel and said holding means, an indicator mounted on an axis on said frame and adapted to co-operate with said calibrated wheel and means attached to said frame to adjust said indicator.

In testimony whereof I affix my signature.

ARMIN ELMENDORF.